United States Patent [19]

Ito

[11] 4,298,285
[45] Nov. 3, 1981

[54] APPARATUS FOR MEASURING CONTOUR CONFIGURATION OF ARTICLES

[75] Inventor: Isao Ito, Nagoya, Japan

[73] Assignee: NGK Insulators, Ltd., Nagoya, Japan

[21] Appl. No.: 48,811

[22] Filed: Jun. 15, 1979

[30] Foreign Application Priority Data

Sep. 11, 1978 [JP] Japan ................................ 53-110600

[51] Int. Cl.³ .......................... G01B 11/24; G01B 11/00
[52] U.S. Cl. .................................... 356/376; 356/394; 356/398
[58] Field of Search ................................ 356/375–376, 356/394, 398, 385–387, 428; 250/224, 560

[56] References Cited

U.S. PATENT DOCUMENTS 3,566,135  2/1971  Mouchart .............................. 250/560
4,064,534 12/1977  Chen et al. ............................ 250/560
4,122,525 10/1978  Eaton .................................... 356/387

OTHER PUBLICATIONS

Reich et al., "High Speed Profile Measurement With Electro-Optics", Optical Engineering, vol. 15, 1,2-76, pp. 44–47.

Primary Examiner—William H. Punter

Attorney, Agent, or Firm—Stevens, Davis, Miller & Mosher

[57] ABSTRACT

An apparatus for measuring contour configuration of articles, particularly brittle articles such as ceramic honeycombs without touching them comprising a turn table on which the article to be measured is placed, a rotary encoder mechanically coupled to the turn table for producing a rotational angle signal representing a rotational position of the article on the turn table, an edge detector including a parallel light projecting member and a parallel light receiving member, these members being arranged on respective sides of the turn table in such a manner that a part of the parallel light is shielded or cut by the article and an edge position signal is produced, a memory for storing a standard edge position signal which will be produced by the edge detector when a standard article having given dimensions placed on the turn table is scanned during a single rotation thereof, and an operation circuit for receiving the rotational angle signal from the rotary encoder, the edge position signal from the edge detector and the standard edge position signal from the memory and comparing these edge position signals under the control of the rotational angle signal to produce a deviation of contour configuration of the article from the standard article.

3 Claims, 6 Drawing Figures

APPARATUS FOR MEASURING CONTOUR CONFIGURATION OF ARTICLES

BACKGROUND OF THE INVENTION

The present invention relates to an apparatus for measuring automatically contour configuration of pillar-shaped articles having a circular or elliptical cross section in a rapid and accurate manner without touching the articles.

Heretofore it has been known to measure the contour configuration, particularly curvature of columnar articles such as a cylindrical body, an elliptic pillar, and the like by urging the article against a limit gauge which has been formed taking into consideration a tolerance of articles or by making contact with a feeler with the article surface so as to measure its dimensions. In these known methods the limit gauge and the feeler directly contacts with the articles. Therefore these methods were not suitable for brittle articles such as thin ceramic honeycombs.

SUMMARY OF THE INVENTION

The present invention has for its object to provide a novel and useful apparatus for measuring contour configuration or dimensions of articles, particularly curvature of articles in a rapid and accurate manner without touching them.

It is another object of the invention to provide an apparatus for measuring a contour configuration of articles without touching them, which apparatus has a simple construction and is easily operated.

According to the invention an apparatus for measuring the contour configuration of articles comprises a turn table on which the article to be measured is placed;

a detector for detecting a rotational angle of said turn table to produce a rotational angle signal;

an edge detector including a parallel light projecting member for projecting a parallel light onto the article and a parallel light receiving member for receiving a part of the parallel light which is not shielded or cut by the article to produce an edge position signal, said parallel light projecting and receiving members being arranged on respective sides of the turn table;

a memory for storing a standard edge position signal which corresponds to a standard article having a given contour configuration; and an operation circuit for receiving said rotational angle signal, the edge position signal and the standard edge position signal and producing a signal which represents a deviation in the contour configuration of the article to be measured from the standard article.

DESCRIPTION OF THE PREFERRED EMBODIMENTS

Figure 1:
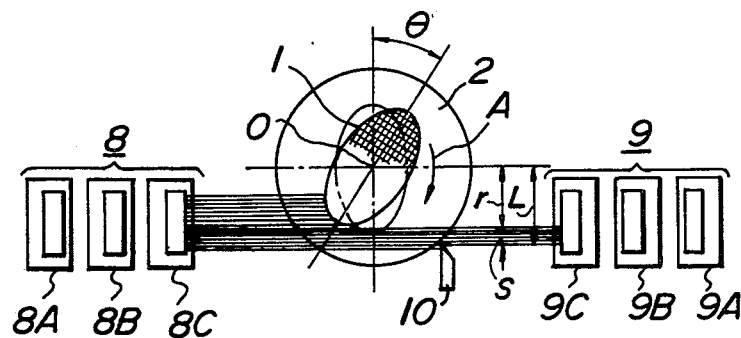
FIG. 1 is a schematic plan view of an embodiment of an apparatus according to the invention.
Figure 2:
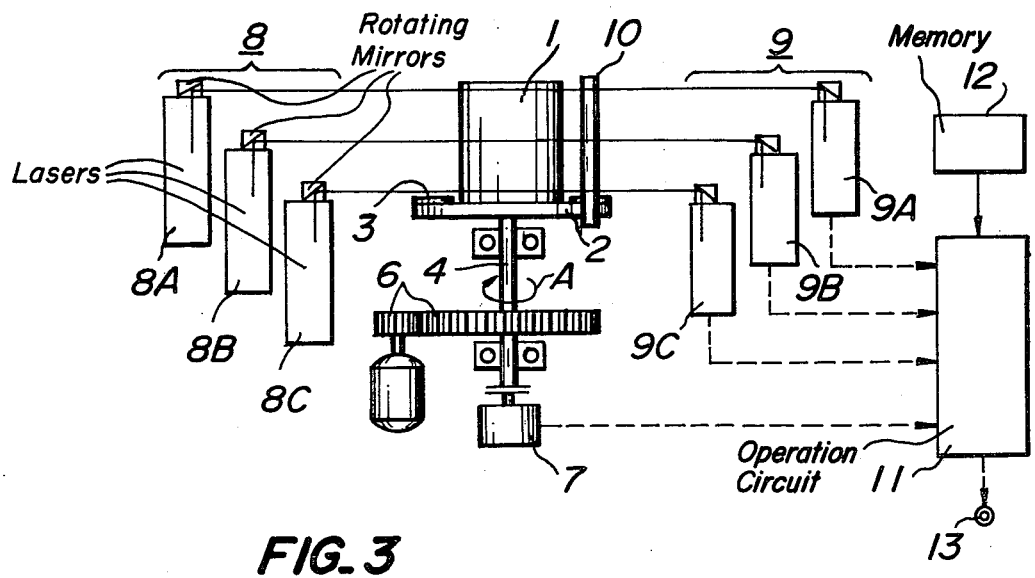
FIG. 2 is a schematic side view of the apparatus shown in FIG. 1.

FIGS. 1 and 2 are schematic views showing an embodiment of an apparatus for measuring the contour configuration of articles according to the invention. An article 1 to be measured is placed on a turn table 2 at its center position. In order to ensure that the article 1 is placed on the table 2 at its center a suitable guide plate 3 is secured on the surface of turn table 2. The turn table 2 is connected to a rotating shaft 4 which is rotated in a direction shown by an arrow A by means of a motor 5 and gear mechanism 6. The rotating axis 4 is further connected to a rotational angle detector such as a rotary encoder 7. The rotary encoder 7 produces a rotational angle signal of the turn table 2 and thus the article 1.

The apparatus further comprises three sets of optical edge detectors each comprising a pair of a parallel light projecting member and a parallel light receiving member arranged on respective sides of the turn table 2. That is to say as shown in FIG. 2 three parallel light projecting members 8A, 8B and 8C are arranged on the left side of the table 2 at different levels and three cooperating parallel light receiving members 9A, 9B and 9C are arranged on the right side of the table at different levels. In this embodiment contour configuration of the article 1 is to be simultaneously measured at three different portions. Each of the parallel light projecting members includes a laser light source and a rotating mirror for reflecting the laser beam in a parallel form as shown in the drawings. Each of the parallel light receiving members has an entrance aperture which is sufficiently wide for receiving the parallel light beam. Instead of the laser light source use may be made of a combination of an ordinary lamp and a concave mirror. Usually an edge of the parallel light beam projected from the members 8A–8C deviates slightly and this deviation might deteriorate the measurement accuracy. In order to avoid such a deviation of the parallel light beam at the edge position an elongated strip 10 is fixedly arranged so as to shield or cut the edge portion of the parallel light. As can be understood later the position of this strip 10 is used as a reference position for measurement.

The rotational angle signal from the rotary encoder 7 and output edge position signals from the parallel light receiving members 9A to 9C of the edge detector are supplied to an operation circuit 11 to which is also supplied a standard edge position signal stored in a memory 12. The standard edge position signal corresponds to that which will be obtained from the edge detector 8, 9 when a standard article having given configuration and dimensions is place on the turn table 2 and is rotated over an angle of 360°. In the operation circuit 11 these edge position signals are compared with each other under the control of the rotational angle signal supplied from the rotary encoder 7 and produces at an output 13 a signal which represents whether or not the measured article 1 has a correct contour configuration, i.e. the correct circumferential dimensions.

Figure 3:
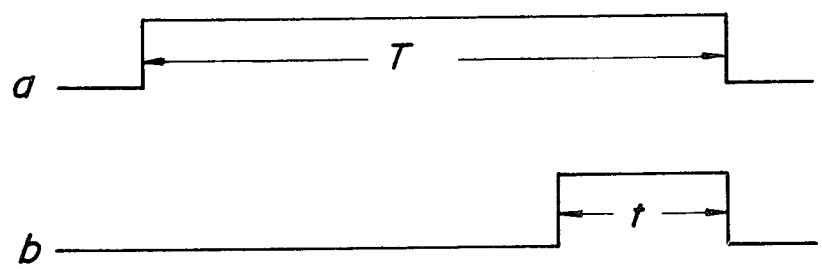
FIGS. 3a and 3b are waveforms for explaining the operation of the apparatus of FIGS. 1 and 2.

Now a measuring step for detecting the curvature of the article 1 with the aid of the apparatus shown in FIGS. 1 and 2 will be explained also with reference to FIG. 3. The article 1 of, for instance, an elliptic pillar is placed on the turn table 2 and is rotated in the direction of arrow A. During this rotation the parallel light projecting members 8A to 8C project the laser beams successively from top to bottom in FIG. 1 at a given period T. In other words the article 1 is scanned by the laser beam during the period T. FIG. 3a shows a waveform of the output signal from one of the parallel light receiving members, for instance the member 9A when the article 1 is not placed on the table 2. Since the laser beam is not shielded or cut by the article the member 9A always receives the laser beam from the member 8A during the period T and thus a duration of the output signal from the member 9A will last for the whole scanning period T. On the contrary when the article 1 is placed on the table 2, the laser beam is shielded by the article and thus a duration of the output signal from the member 9A is reduced to t as illustrated in FIG. 3b. As can be seen from FIG. 1 this duration t is related to a distance S between the strip 10 and an edge of the article 1. Therefore a distance r between the edge of the article 1 and a given reference point such as a center 0 of the table 2 can be measured as a difference between a constant distance L from the reference point 0 to the fixedly arranged strip 10, and the measured distance S. In this manner the distance r can be measured and this distance varies in accordance with the rotation of the turn table 2. Memory 12 stores the standard edge position values for the distance r at respective rotational angles $\theta$ of the turn table 2 as well as maximum permissible tolerance values for edge position deviation from the standard. Thus in the operation circuit 11 a deviation in the distance r from the standard value can be calculated at respective angular positions under the control of the rotational angle signal supplied from the rotary encoder 7 and compared with the maximum permissible deviation tolerance. In this embodiment since the measurement is effected at three different positions of the article 1 the perpendicularity of the article surface can be also measured by comparing three values calculated for distance r at three different levels.

As explained above the guide plate 3 is secured on the surface of turn table 2 for positioning the article. However, in practice, the article could not be precisely placed on the table 2 at its center 0, but the center of article 1 deviates from the table center 0. This deviation might cause errors in measurement. However according to the invention such a deviation can be compensated in the operation circuit 11. This will be explained with reference to FIGS. 4 and 5.

Figure 4:
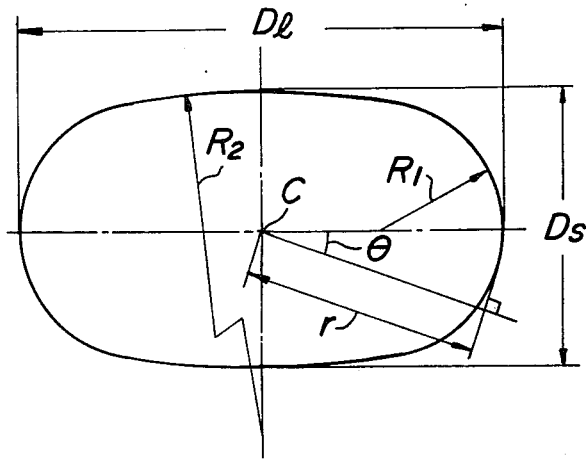
FIG. 4 is a schematic view illustrating a contour shape of a substantially elliptic pillar for explaining an operation of the apparatus according to the invention.
Figure 5:
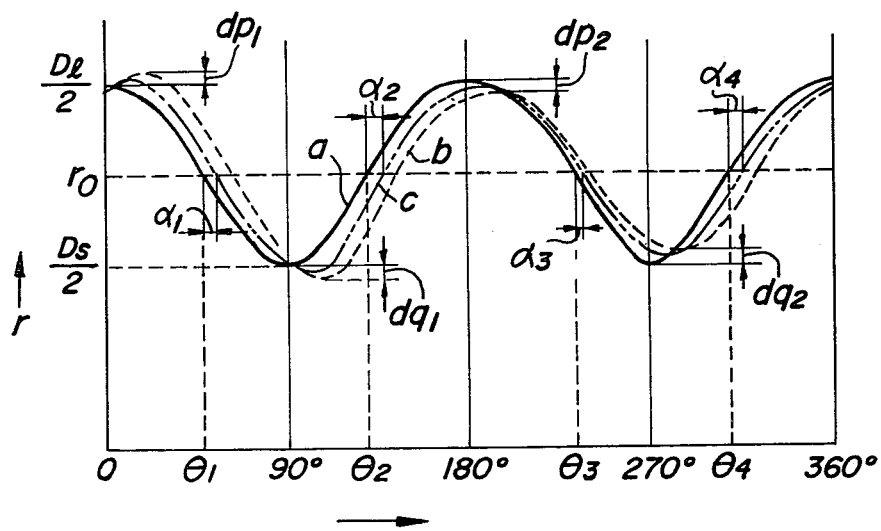
FIG. 5 is a graph showing a deviation of contour configuration of articles for explaining a manner of compensation for geometrical errors of the article.

FIG. 4 is a schematic view illustrating a contour configuration of an article which is substantially elliptic shape. The standard article has a major diameter of $D_l$, a minor diameter of $D_s$, a minor radius of curvature of $R_1$ and a major radius of curvature of $R_2$ as shown in FIG. 4. Then the distance r from the center C to the edge of article at an angle $\theta$ can be expressed as follows:

$$\begin{cases} r = R_1 + (D_l/2 - R_1)\cos\theta \\ \text{or} \\ r = R_2 - (R_2 - D_s/2)\sin\theta \end{cases}$$

If such a standard article is correctly placed on the turn table 2 at its center 0, the operation circuit 11 can calculate the distance r while the table 2 is rotated over one revolution. This calculated distance r can be shown by a solid curve a in FIG. 5. However in the actual measurement the center C of article 1 deviates from the center 0 of table 2 and then the calculated distance r may be expressed by a broken curve b in FIG. 5. In order to compensate such a deviation of center position the curve b in FIG. 5 may be converted into a dot and chain curve c by introducing the following correction amounts:

$$\begin{cases} \text{In the major axis direction: } (dp_1 + dp_2)/2 \\ \text{In the minor axis direction: } (dq_1 + dq_2)/2 \end{cases}$$

In this manner the deviation of center position can be compensated. However in the actual measurement there will be also produced an angular error, i.e. a deviation in the rotational direction. This angular error can be corrected by introducing a correction angle $\alpha$ which can be derived by the well-known method of least squares. That is to say the correction angle $\alpha$ can be derived by an equation $$\sum_{n=1}^{4} (\alpha - \alpha_n)^2 \longrightarrow \text{minimum}$$

wherein $\alpha_1, \alpha_2, \alpha_3$ and $\alpha_4$ are deviation angles between the ideal curve a and the curve c at given four angular positions $\theta_1, \theta_2, \theta_3$ and $\theta_4$, respectively. After the correction has been effected in the manner mentioned above the deviation of the contour configuration of the article 1 from the standard article can be detected in an extremely accurate manner. The operation circuit 11 further recognizes whether the calculated deviation exceeds the maximum permissible tolerance or not and produces a signal at the output 13, which signal may be printed or displayed, if desired.

Figure 6:
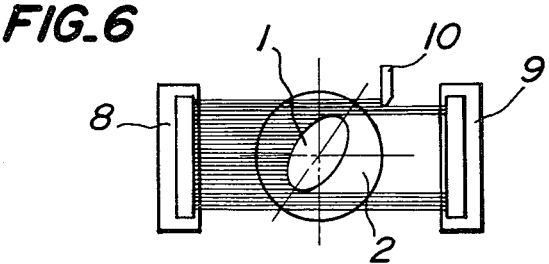
FIG. 6 is a schematic plan view showing another embodiment of the apparatus according to the invention.

It should be noted that the present invention is not limited to the embodiment explained above, but many modifications can be conceived within the scope of the invention. For instance, various kinds of contour configuration of various shaped articles such as a cylindrical pillar, a polygonal pillar may be measured by the apparatus according to the invention. Further in the embodiment shown in FIGS. 1 and 2 the parallel light projecting members 8 emit the laser beam from only one side of the article. But if the article 1 to be measured is relatively small, the whole article may be irradiated by the parallel light emitted from the parallel light projecting member 8 as shown in FIG. 6. In this case the light receiving member 9 should have an entrance aperture which is sufficiently wide to receive the light passing through both sides of the article 1. In the above embodiment the distance S is measured by detecting the duration of the output signal from the light receiving member 9, but the distance S may be detected by an amplitude of the output signal from the light receiving member 9, if the article is simultaneously irradiated by a wide parallel light. In this case it is not necessary to scan the laser beam in the light projecting member 8 and thus the rotating mirror may be omitted, and it is sufficient to rotate the article to be measured over an angle of 180° instead of 360°.

As explained above in detail the apparatus according to the invention can measure accurately the outer configuration, particularly the curvature of the article without touching the article and thus is very suitable for measuring brittle articles. Moreover since the measurement can be carried out in a very short time such as 2 to 3 seconds the measuring apparatus of the present invention is particularly applicable to articles such as ceramic honeycombs which are manufactured on a mass production scale.

What is claimed is:

1. An apparatus for measuring contour configuration of articles comprising;
- a turn table on which the article to be measured is placed;
- a detector for detecting a rotational angle of said turn table to produce a rotational angle signal;
- an edge detector having a plurality of pairs of parallel light projecting members for projecting a parallel light onto the article and parallel light receiving members for receiving a part of the parallel light which is not shielded or cut by the article to produce an edge position signal, said parallel light projecting and receiving members being arranged on respective sides of the turn table and arranged at different positions along the edge of article to be detected;
- a memory for storing a standard edge position signal which corresponds to a standard article having given contour configuration and the maximum permissible tolerance of a deviation of a detected edge position signal from said standard edge position signal; and
- an operation circuit for receiving said rotational angle signal, the edge position signal and the standard edge position signal and producing a signal which represents a deviation in the contour configuration of the article to be measured from the standard article by comparing the detected deviation with said maximum permissible tolerance, said operation circuit further determining the deviation in center position of the article with respect to the turn table and compensating for said center position deviation.

2. An apparatus for measuring contour configuration of articles comprising;
- a turn table on which the article to be measured is placed;
- a detector for detecting a rotational angle of said turn table to produce a rotational angle signal;
- an edge detector having a plurality of pairs of parallel light projecting members for projecting a parallel light onto the article and parallel light receiving members for receiving a part of the parallel light which is not shielded or cut by the article to produce an edge position signal, said parallel light projecting and receiving members being arranged on respective sides of the turn table and arranged at different positions along the edge of article to be detected;
- a memory for storing a standard edge position signal which corresponds to a standard article having given contour configuration and the maximum permissible tolerance of a deviation of a detected edge position signal from said standard edge position signal; and
- an operation circuit for receiving said rotational angle signal, the edge position signal and the standard edge position signal and producing a signal which represents a deviation in the contour configuration of the article to be measured from the standard article by comparing the detected deviation with said maximum permissible tolerance, said operation circuit further determining the deviation in angular position of the article with respect to the turn table and compensating for said angular position deviation.

3. An apparatus for measuring contour configuration of articles comprising;
- a turn table on which the article to be measured is placed;
- a detector for detecting a rotational angle of said turn table to produce a rotational angle signal;
- an edge detector having a plurality of pairs of parallel light projecting members for projecting a parallel light onto the article and parallel light receiving members for receiving a part of the parallel light which is not shielded or cut by the article to produce an edge position signal, said parallel light projecting and receiving members being arranged on respective sides of the turn table and arranged at different positions along the edge of article to be detected;
- a memory for storing a standard edge position signal which corresponds to a standard article having given contour configuration and the maximum permissible tolerance of a deviation of a detected edge position signal from said standard edge position signal; and
- an operation circuit for receiving said rotational angle signal, the edge position signal and the standard edge position signal and producing a signal which represents a deviation in the counter configuration of the article to be measured from the standard article by comparing the detected deviation with said maximum permissible tolerance, said operation circuit further determining a deviation in center position of the article with respect to the turn table and a deviation in angular position of the article with respect to the turn table and compensating for said center position and angular position deviations.

* * * * *